C. M. WARD.
FLUID OPERATED CLUTCH.
APPLICATION FILED AUG. 4, 1915.
1,254,951.
Patented Jan. 29, 1918.
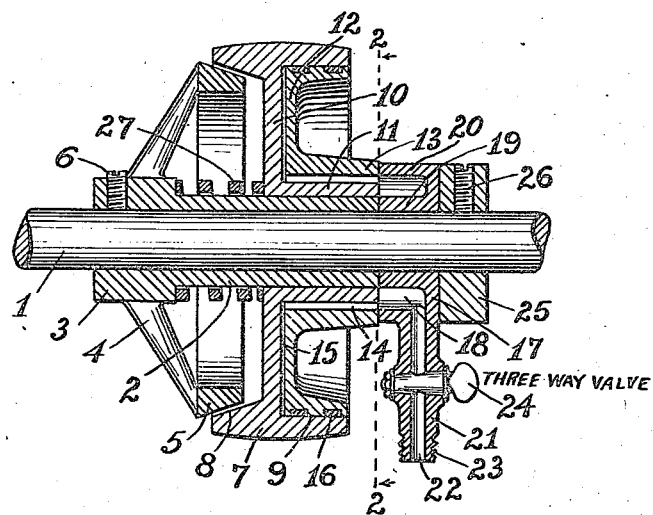
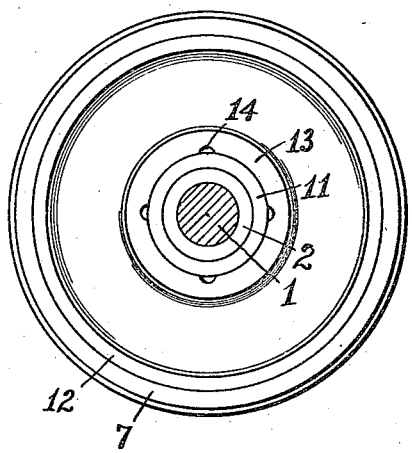
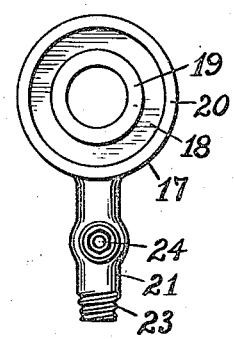
Inventor
Charles M. Ward

UNITED STATES PATENT OFFICE.

CHARLES M. WARD, OF CLEVELAND, OHIO.

FLUID-OPERATED CLUTCH.

1,254,951.     Specification of Letters Patent.    Patented Jan. 29, 1918.

Application filed August 4, 1915. Serial No. 43,505.

*To all whom it may concern:*

Be it known that I, CHARLES M. WARD, a citizen of the United States, residing at Cleveland, in the county of Cuyahoga and State of Ohio, have invented certain new and useful Improvements in Fluid-Operated Clutches, of which the following is a specification.

This invention relates to clutches, and has for its object to provide a clutch of simple design which is self contained and is operated by means of fluid pressure, and is therefore not only easily controlled and quick in action, but most practical and efficient for many purposes, especially for lathes and similar machines.

With the above and other objects in view as will be readily understood, the invention will be hereinafter fully described with reference to the accompanying drawings, which simply illustrate the same, and the novel features of the invention will be distinctly pointed out in the appended claims.

Figure 1 is a sectional view of a clutch constructed in accordance with my invention, Fig. 2 is a sectional view taken on line 2—2 of Fig. 1, and Fig. 3 is a face view of the fluid pressure head.

In the drawings like characters of reference indicate corresponding parts.

Referring to the drawings, 1 represents the spindle of a lathe or other similar machine; or any other shaft, which is adapted to be driven and it is necessary to start and stop quickly. Fixed to this spindle is an elongated sleeve 2, the outer enlarged hub end 3 of which carries a plurality of inwardly inclined spider arms 4, which support a beveled ring 5. Said elongated sleeve is secured to the spindle by means of a set screw 6, or in any other suitable manner. Loosely mounted upon the inner end of the elongated sleeve 2 is a driving pulley or belt wheel 7, which is hollowed out and its inner peripheral surface beveled at 8, to correspond with the beveled ring 5 and fit over the same to lock the driving pulley to said beveled ring in the usual manner. The other side of the driving pulley 7 is bored out at 9, thereby leaving a web or diaphragm 10, and integral therewith a bushing 11, which preferably extends a little beyond the edge of the driving pulley. Rotatably mounted upon the bushing 11 and within the bored out portion 9 of the driving pulley, is a flanged disk 12 having a boss 13 of the same length as the bushing 11. The inner surface of the boss 13 is provided with a plurality of longitudinal grooves or ports 14, for admitting fluid pressure to the space 15 between the disk 12 and the diaphragm 10 of the driving pulley, to force the beveled surface 8 thereof into locking engagement with the beveled ring 5, to drive the shaft, as will be hereinafter explained. In order to make the joint between the bored out portion 9 of the driving pulley and the flanged disk 12 air tight, the flange of said disk is provided with ordinary split packing rings designated by 16.

Fluid pressure is introduced to the grooves 14 by means of a circular head 17, one face of which is provided with a circular recess 18 for covering the inlets of the grooves, and thereby leaving inner and outer circular walls 19 and 20, which abut respectively the ends of the elongated sleeve 2 and the boss 13 of the flanged disk 12. Said head is adapted to remain stationary, while the spindle 1 may rotate therein. Depending from the head is a stem 21 having an opening 22 therethrough, which leads to the circular recess 18 of the head. The free end of this stem is threaded at 23 for connection to the fluid pressure supply line. It is desirable to be able to regulate the fluid pressure admitted to and exhausted from the clutch so that it will operate at the most efficient speed, and therefore the stem 21 is provided with a control valve 24, of the usual three-way type which may be turned to admit the proper fluid pressure or permit the escape of the same. A collar 25 is fixedly secured to the spindle 1 by means of a set screw 26, in such relation that it will hold the end of the inner circular wall 19 of the head 17 against the end of the elongated sleeve 2. A coiled spring 27 interposed between the enlarged hub end 3 of the elongated sleeve and the diaphragm 10 of the driving pulley, normally keeps the peripheral beveled surface 8 of the latter out of engagement with the beveled ring 5.

The manner of operation will be briefly explained:—In practice the parts are as shown, except that the diaphragm 10 of the driving pulley engages the face of the flanged disk 12 due to the action of the coiled spring 27. When the admission of the fluid pressure is cut off, the driving pulley 7 is running loosely on the elongated sleeve 2 and the spindle 1 is at rest. As soon as fluid pressure is admitted to the head 17, it enters the grooves 14 and exerts force against the diaphragm 10 of the driving pulley, thereby causing its beveled peripheral surface 8 to lockingly engage the beveled ring 5 and drive the spindle 1. Upon shutting off the fluid pressure and at the same time allowing the circular recess 18 to be exhausted through the control valve 24, the coiled spring 27 will force the driving pulley out of engagement with the beveled ring, and the driving pulley will rotate freely on the bushing 11, whereby the spindle will come to a standstill.

Although the elements set forth and described are well adapted to accomplish the intended results, it is to be understood that slight changes in the details of construction and arrangement of the parts may be made within the scope of the claims.

Having fully described my invention, what I claim is:

1. The combination with a rotatable spindle of a driving pulley rotatably supported thereby and adapted to slide longitudinally thereon, means fixed to the spindle adapted to be engaged by the driving pulley, the driving pulley being bored out at one side, a disk within the bored out portion of the driving pulley, the disk being provided with ports leading to the bored out portion of the driving pulley, a head upon the spindle and engaging said disk, the head having a recess therein communicating with said ports, and the head being stationary, substantially as described.

2. The combination with a rotatable spindle of a driving pulley rotatably supported thereby and adapted to slide longitudinally thereon, means fixed to the spindle adapted to be engaged by the driving pulley, the driving pulley being bored out at one side, a disk within the bored out portion of the driving pulley, the disk being provided with ports leading to the bored out portion of the driving pulley, a head upon the spindle, and engaging said disk, the head having a recess therein communicating with said ports, the head being stationary, and means carried by said head for controlling the fluid pressure admitted thereto, substantially as described.

3. The combination with a rotatable spindle of an elongated sleeve fixed thereto, a beveled ring carried by the sleeve, a driving pulley loosely mounted upon the elongated sleeve and adapted to slide longitudinally thereon, the driving pulley having a beveled surface adapted to lockingly engage said beveled ring, the driving pulley being bored out thereby leaving a diaphragm and bushing, a disk within the bored out portion of the driving pulley and rotatably mounted upon the bushing, the disk being provided with grooves adjacent said bushing, and means for introducing a fluid pressure to said grooves for forcing the beveled surface of the driving pulley into locking engagement with said beveled ring and said means being stationary and engaging said disk, substantially as described.

4. The combination with a rotatable spindle of an elongated sleeve fixed thereto, a beveled ring carried by the sleeve, a driving pulley loosely mounted upon the elongated sleeve, and adapted to slide longitudinally thereon, the driving pulley having a beveled surface adapted to lockingly engage said beveled ring, the driving pulley being bored out thereby leaving a diaphragm and bushing, a disk within the bored out portion of the driving pulley and rotatably mounted upon the bushing, the disk being provided with grooves adjacent said bushing, a stationary head loosely mounted upon the spindle, the head having a circular recess communicating with said grooves, the head abutting said disk and the end of said sleeve, the head having a stem, the stem being provided with an opening leading to said circular recess, and a plug arranged in said stem for controlling the admission of the fluid pressure, substantially as described.

5. The combination with a rotatable spindle of an elongated sleeve fixed thereto, a beveled ring carried by the sleeve, a driving pulley loosely mounted upon the elongated sleeve and adapted to slide longitudinally thereon, the driving pulley having a beveled surface adapted to lockingly engage said beveled ring, the driving pulley being bored out thereby leaving a diaphragm and bushing, a disk within the bored out portion of the driving pulley and having a boss rotatably mounted upon the bushing, the boss of the disk being provided with grooves adjacent said bushing, a stationary head loosely mounted upon the spindle, the head having a circular recess communicating with said grooves, the head abutting the end of said boss and the end of said sleeve, the head having a stem, the stem being provided with an opening leading to said circular recess, a control plug arranged in said stem, and a spring on said sleeve tending to force the beveled surface of the driving pulley out of engagement with said beveled ring, substantially as described.

In testimony whereof I affix my signature.

CHARLES M. WARD.